UNITED STATES PATENT OFFICE.

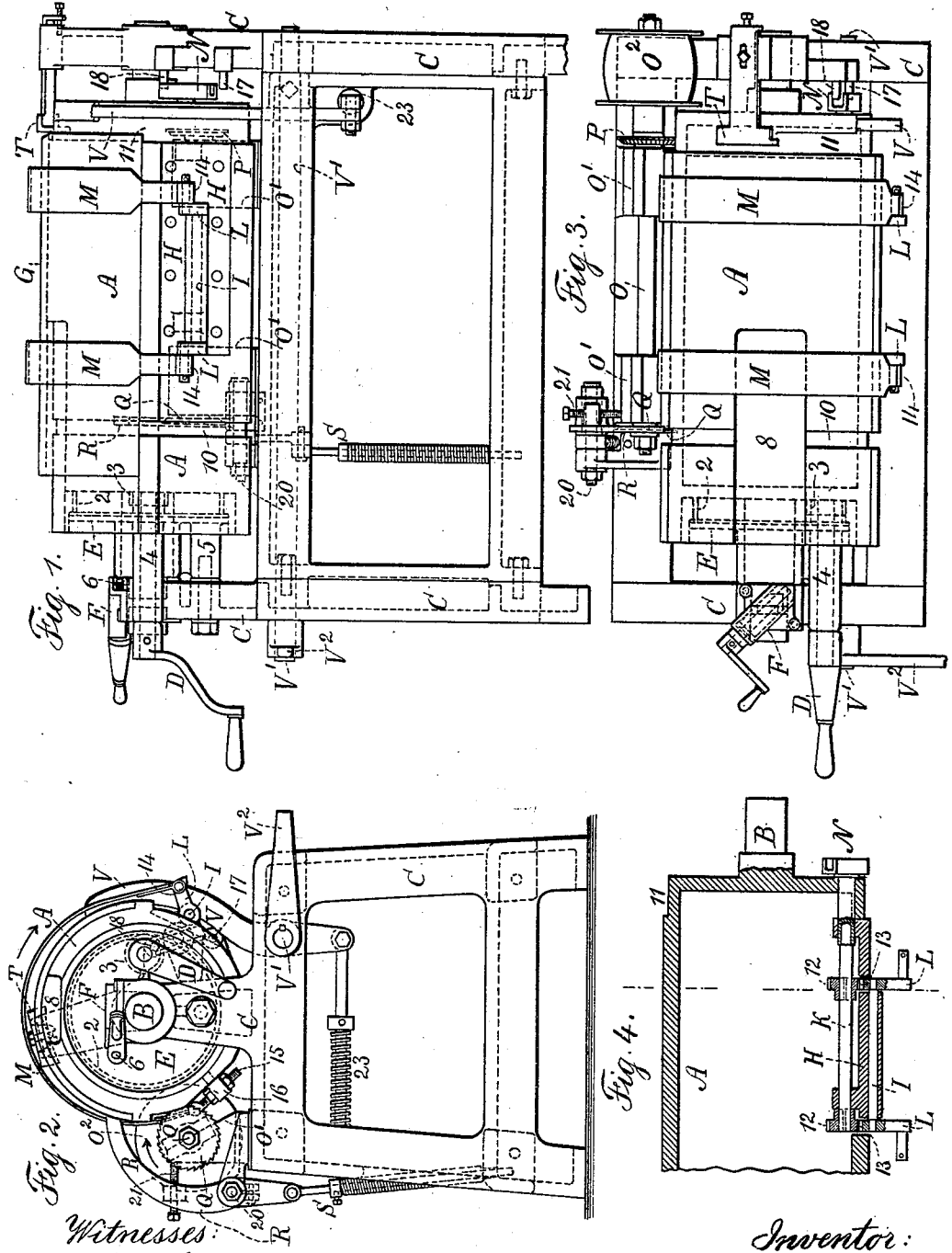

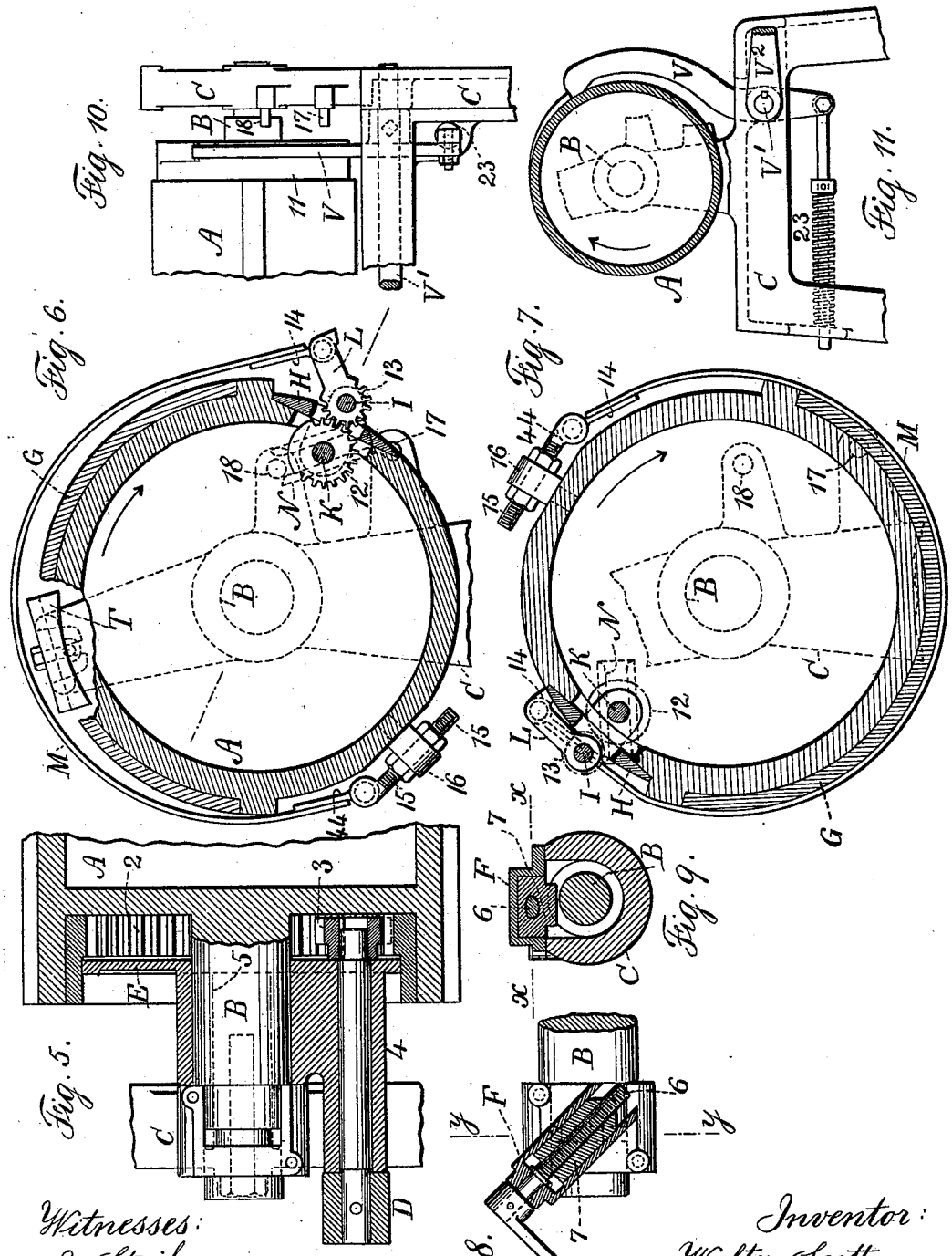

WALTER SCOTT, OF PLAINFIELD, NEW JERSEY.

STEREOTYPE-FINISHING MACHINE.

SPECIFICATION forming part of Letters Patent No. 646,669, dated April 3, 1900.

Application filed September 29, 1898. Serial No. 692,163. (No model.)

*To all whom it may concern:*

Be it known that I, WALTER SCOTT, a citizen of the United States, residing at Plainfield, in the county of Union and State of New Jersey, have invented an Improvement in Stereotype-Finishing Machines, of which the following is a specification.

Stereotypes have been cast as a segment of a cylinder, with one end beveled and adapted to be received by the claws or holding devices upon the cylinder of the printing-press, and the upper end has usually been either the rough top end of the casting in the mold or else sufficiently long to be trimmed off upon a bevel, so as to fit upon the cylinder of the printing-press. The present improvement is adapted especially to finishing off the two ends of the stereotype by the action of cutters.

In carrying out this invention I prefer to make use of a cylinder upon which can be applied the concave side of the cast stereotype, and the rough or square end of the same is trimmed off to the proper bevel, and the other end of the stereotype is dressed or trimmed simultaneously or afterward, so that the two ends of the stereotype are at the proper distance apart to be held by the claws or other devices upon the printing-press cylinder; and the present invention relates to the peculiarities of construction and combination of devices hereinafter set forth.

In the drawings, Figure 1 is a side elevation; Fig. 2, an end view; Fig. 3, a plan. Fig. 4 is a section of the cylinder at the rear end. Fig. 5 is a sectional plan, in larger size, of the cylinder and disk at the front end. Fig. 6 is a cross-section of the cylinder near the holding-band with the same loose and part of the cylinder broken open. Fig. 7 is a similar section with the holding-band tight. Fig. 8 is a plan of part of the cylinder-shaft, screw and bearing, and the box and block in section at the line $x\, x$, Fig. 9. Fig. 9 is a cross-section at the line $y\, y$, Fig. 8. Fig. 10 is an elevation, and Fig. 11 a cross-section, of the cylinder and stop-pawl on the same scale as Figs. 1 to 4.

The cylinder A is mounted upon a shaft or end journals B, which are supported in end frames C of any suitable character, and the cylinder has internal heads by which it is connected to the shaft, and at one end there is an internal gear 2, driven by a pinion 3 upon a shaft with a crank D, so that the crank D can be turned by hand to give rotation to the cylinder A. I find it advantageous to employ a disk E that closes the otherwise open end of the cylinder A, so as to keep any chips or other foreign substances from the gearing, the pinion 3 being behind the disk and between the same and the closed end or head of the cylinder, and the shaft B passes through this disk, and there is upon the disk a hub or bearing 4 for the shaft of the crank, so that the shaft, crank, and pinion are supported by the disk, and in order to prevent the disk E turning there is a block or arm 5 upon the disk that might pass into a recess in the bearing upon the end frame C or be held by a bolt, as shown, and it is advantageous to make this end frame C hollow—that is to say, with inward flanges at each side of the bearing—so that the screw passes through the frame into the block 5. By these means the crank D can be employed for giving to the cylinder A a rotation in the direction of the arrow and by hand, and the gearing will be kept clean and the disk, cylinder, and shaft can receive a motion endwise, as hereinafter set forth.

The shaft B is reduced so that the journals thereof pass through the bearings in the end frames C, and the shoulders upon the shaft B are at a less distance apart than the bearings of the end frames, so that the cylinder and the parts connected therewith can be adjusted endwise by sliding the end portions of the shaft in the bearings in the end frames, and with this object in view there is an annular groove turned in the journal at one end of the cylinder, and a screw 6 in a supporting-box F is made to act upon a sliding block 7, having a cross-lug or key entering the annular groove in the journal of the shaft B, as seen in Figs. 8 and 9.

The box F is fastened upon the top of the bearing of the end frame by screws, and by turning the screw 6 the sliding block 7 will be moved endwise of the cylinder and carry with it the journals and shaft of said cylinder, and thereby adjust the cylinder endwise, the object being to bring the cylinder and the stereotype upon it accurately into position in relation to the rotary cutters before the cutting or trimming operation is commenced.

I find it convenient to place the screw 6 diagonally to the axis of the cylinder, as shown, so that the handle by which the screw is turned is easy of access by the attendant while examining the position of the stereotype, and this handle and screw are out of the way when the crank D is being rotated in turning the cylinder.

The cylinder A is made with a recess at 8, which comes beneath the middle part of the stereotype G near one end thereof as it lies upon the cylinder. The object of this recess is to give the attendant an opportunity to pass the hand in beneath the stereotype in grasping the same and sliding it endwise of the cylinder while putting the stereotype upon the cylinder or while removing the same or removing the piece of the stereotype-plate that is cut off.

The cylinder A when in position for receiving the stereotype has the recess 8 in the upper portion, so that the stereotype can be slipped unobstructedly upon the cylinder A or removed therefrom with facility, and in the surface of the cylinder A there is an annular recess at 10 and a similar recess or offset at the back end of the cylinder at 11, because the rotary cutters that trim the stereotype are adjacent to these recesses, and the recesses allow the cutters to trim the projecting ends of the stereotype without the cutters coming into contact with the cylinder.

At one side of the cylinder A is an opening at which is received a cap H, carrying bearings and the two shafts I and K. The shaft K comes inside the cylinder and the shaft I outside, and upon the shaft K are gears 12, engaging the gears 13 upon the band-tightener arms L, which arms L are fastened to the shaft I, and these arms L have pins at their ends, around which are loops or swivels 14, connected to the bands M, which bands are adapted to pass over the stereotype-plate as it rests upon the cylinder, and the back ends of the bands are connected by swivels or joints 44 to the screws 15, that pass through eyebolts 16 upon the cylinder A, and there are nuts to the screws 15, by which the bands M can be adjusted to the desired tightness, and it is now to be understood that when the shaft I is turned in one direction the arms L loosen the bands M, (see Figs. 2 and 6,) and when turned in the other direction the arms L are swung so that their ends come in contact with the surface of the cylinder A, (see Fig. 7,) and the bands are tightened, and the swivels 14 passing beyond the center line of the shaft I the tension holds the arms L against the surface of the cylinder, so that the bands firmly hold the stereotype while the cylinder is being revolved and the ends of the stereotype dressed.

In order to give motion to the shafts K and I, the end of the shaft K projects and has upon it the tumbler N in the form of a block grooved transversely, and there are upon the end frame C or upon the support for the end bearing pins 17 and 18, projecting inwardly and in the path of the tumbler N and in such a position (see Fig. 6) that when the cylinder commences to rotate the pin 17, acting in the tumbler N, gives to it and the shafts K a partial rotation and also turns the shaft I and moves the belt-tightening arms L, so as to tighten the bands M and hold the stereotype or electrotype firmly upon the cylinder A, and as the rotation is being completed and the stereotype brought around to the original position the other pin 18, (see Fig. 7,) acting in the tumbler N, gives to the same and to the shafts K and I a partial rotation in the reverse direction to release the bands M and liberate the stereotype or electrotype.

The shaft O has upon it the cutters P and Q, and the shape of these cutters is such that they are adapted to dress off the ends of the stereotype-segment with the proper bevel or shoulder to be received by the clamps or other fastenings upon the printing-cylinder of the press. Usually these cutters are adapted to produce a bevel of about forty-five degrees and a perpendicular cut that determines the length between the ends of the stereotype-plate, and these cutters P and Q are preferably fastened upon the shaft O at a distance apart corresponding to the length of the stereotype, so that both ends of the stereotype-plate can be dressed off simultaneously. The shaft O is supported in bearings O' upon the frame of the machine, and the pulley O² upon the end of the shaft is adapted to a belt by which the shaft and cutters can be revolved at the desired speed.

The gage R is in the form of a segment pivoted at 20 upon an arm or bracket extending out from the main frame, and the lower end of the gage is provided with a rod and expansible spring S, and the position of the parts is such that when the upper end of the gage is moved close to the stereotype the spring presses the gage toward the stereotype, and when the upper end of the gage is drawn away from the stereotype the joint between the rod and the lower end of the gage comes against the frame of the machine and the spring tends to hold the upper end of the gage away from the stereotype, and it is advantageous to provide a screw 21 through a lug upon the gage and acting against one of the bearings for the shaft O, so as to determine the proximity of the upper end of the gage to the stereotype-plate, and this gage is in such a position in relation to the cutter Q that the gage can be brought up against the edge of the column or page of type on the stereotype, so as to determine the position to which the stereotype-casting is to be slipped upon the cylinder A in order that the cutter Q may act at the proper place upon such stereotype or electrotype.

If the stereotype is of a length corresponding to the distance between the cutters P and Q, the stereotype is to be slipped along upon the cylinder A and beneath the bands M until the beveled end of the stereotype comes against a gage T, that is upon the bearing at the back end frame, and this gage T can be adjusted and clamped by screws, as usual, and then the handle or crank D is turned by hand and the cylinder A rotated in the direction of the arrow, and the bands are tightened upon the stereotype, as heretofore indicated, so that the stereotype is carried around with the cylinder and coming below the cylinder A the edge of the stereotype comes into contact with the cutters P and Q, that dress off the ends of the stereotype, and the cutter Q simultaneously separates from the stereotype the waste or upper end of the metal that forms the gate in the stereotype-mold, the line of cut and separation between the stereotype and the gate being at the annular recess 10, and the cylinder A completes its revolution, and the cut-off portion or gate of the stereotype is now upon the top of the cylinder and hence does not need any support and can be lifted off by the attendant, and the bands M are loosened, as aforesaid, as the cylinder completes its rotation, and the attendant can thrust his hand into the recess 8 in seizing the stereotype and drawing it off endwise of the cylinder A, and another stereotype can be substituted and dressed, as aforesaid.

If the stereotype is shorter than the distance between the two cutters P and Q, such stereotype is placed upon the cylinder A in such a position that the columns or pages of type come adjacent to the gage R, and then the cylinder is started and the gate of the mold cut off, as aforesaid, and this end of the cylinder dressed by the cutter Q, and after this has been done and the bands loosened as the cylinder A completes its revolution, as aforesaid, the stereotype is then pushed along upon the cylinder A, so as to bring the undressed end of the casting against the gage T, and the cylinder is again rotated for dressing off the back end, the cutter P acting at the end of the cylinder, and the cutter Q not having any portion of the stereotype adjacent to it is hence out of action at this time.

I do not limit myself to driving the cylinder A by hand acting upon a crank, as any suitable mechanism may be made use of for rotating the cylinder at the proper time. Where the cylinder is rotated by power, it is advantageous to make use of a stop-pawl V for holding the cylinder at the end of the rotation while one stereotype or electrotype is being taken off and another one inserted, and this stop-pawl may hold the cylinder against the action of the power which rotates it, there being an intervening frictional device of any suitable character, and this stop-pawl is advantageously pivoted at V' and acted upon by a spring 23 to throw the end of the pawl toward the cylinder to engage a projection on the periphery of the cylinder A, and I find it most convenient to locate this stop-pawl V at the back end of the cylinder A, and because the attendant is usually at the other end of the cylinder A the pawl V is represented as mounted upon a shaft V', with a handle or lever V² at the end of the shaft V', adjacent to the attendant, so that he can throw back the pawl in allowing the cylinder A to start, and this stop-pawl arrests the movement of the cylinder when a complete rotation has been made, and then the attendant can adjust the stereotype or electrotype plate or insert another and start the rotation of the cylinder by moving back the pawl V by the lever or handle V².

I claim as my invention—

1. In a machine for dressing and finishing stereotypes or electrotypes having cutters and means for actuating the same, of a cylinder upon which the curved stereotype-plate is received, such cylinder having a depression or recess in the outer surface for the insertion of the hand or fingers in moving the plate lengthwise of the cylinder, such recess preventing foreign substances passing within the cylinder, substantially as set forth.

2. In a stereotype or electrotype finishing machine, the combination with the cylinder, upon which the stereotype or electrotype is received, having a closed head within the cylinder at a distance from the end, of a separate internal gear secured within the cylinder near the end, a disk within the cylinder end and setting adjacent to the ends of the teeth, a driving-shaft passing through a bearing upon the disk and mechanism for rotating the shaft, and a pinion on the end of the shaft between the disk and the closed head and engaging the internal gear, substantially as set forth.

3. In a stereotype or electrotype finishing machine, the combination with the cylinder, upon which the stereotype or electrotype is received, having a closed head within the cylinder at a distance from the end, of a separate internal gear secured within the cylinder near the end, a disk within the cylinder end and setting adjacent to the ends of the teeth, a driving-shaft passing through a bearing upon the disk, and mechanism for rotating the shaft, and a pinion engaging the internal gear and having a sliding connection to the shaft whereby the cylinder, receiving the stereotype, can be adjusted in the direction of the axis, the shaft sliding within the pinion, substantially as set forth.

4. The combination in a machine for finishing stereotypes or electrotypes, with the cylinder having a longitudinal opening at one side thereof, of a removable cap-plate fitted into such opening, bearings on the said plate, a longitudinal shaft and gears, pivoted band-tightener arms, gears for engaging the gears on the longitudinal shaft, and pins on the ends of the arms for engaging swivels upon the ends of the bands, substantially as set forth.

5. The combination in a machine for dressing stereotype-plates with the cylinder, of bands for holding the stereotype-plate, tightener-arms and swivel connections to the bands at one end, adjusting-screws and pivotal connections between the same and the bands at the opposite ends to the tightener-arms, substantially as set forth.

6. The combination in a machine for finishing stereotypes or electrotypes and having a rotary cutter, of a cylinder for receiving the curved plate, a shaft for supporting such cylinder capable of receiving an end movement in its bearings and having an annular groove around the shaft, a diagonal screw and handle for turning the same, a support for the screw, a block acted upon by the screw and having a projection entering the annular groove of the shaft for giving to the shaft and cylinder an endwise movement in adjusting the position of the plate in relation to the cutters, substantially as set forth.

7. The combination with the cylinder and cutters in a stereotype-finishing machine and bands for holding the stereotype to the cylinder, of a pivoted gage for indicating the position for the stereotype or electrotype longitudinally of the cylinder and in reference to the rotary cutters, and a spring and rod for holding the gage toward or away from the stereotype, substantially as set forth.

8. The combination in a machine for finishing stereotypes or electrotypes having a cylinder for holding the curved plate and means for revolving the same, of a rotary cutter for separating the gate or waste end of the stereotype-plate and a gage for determining the position of the plate in relation to the cutter, a pivotal support for the gage and a spring for pressing the gage toward the plate or for holding the gage at a distance from the plate, substantially as set forth.

9. The combination in a stereotype-finishing machine with the cylinders and cutters, of an internal gear at one end of the cylinder, a pinion and shaft for driving the cylinder and a disk for inclosing the gearing and excluding foreign substances, such as chips from the cutters, substantially as set forth.

Signed by me this 27th day of September, 1898.

WALTER SCOTT.

Witnesses:
GEO. T. PINCKNEY,
S. T. HAVILAND.